United States Patent [19]

Mori

[11] Patent Number: 4,852,422
[45] Date of Patent: Aug. 1, 1989

[54] DRIVING CABLE CONNECTION

[75] Inventor: Keiji Mori, Toyota, Japan

[73] Assignee: Aisin Seiki Kabushiki Kaisha, Kariya, Japan

[21] Appl. No.: 633,006

[22] Filed: Jul. 20, 1984

Related U.S. Application Data

[63] Continuation of Ser. No. 280,368, Jul. 6, 1981, abandoned, which is a continuation of Ser. No. 24,977, Mar. 29, 1979, abandoned.

[30] Foreign Application Priority Data

Mar. 30, 1978 [JP] Japan ..................................... 53-3700

[51] Int. Cl.$^4$ .............................................. F16C 1/26
[52] U.S. Cl. ................................. 74/502.6; 74/500.5; 74/502.4; 49/362; 403/269
[58] Field of Search ............. 74/501 R, 501 P, 500.5, 74/502.6; 49/352, 362; 403/267, 269

[56] References Cited

U.S. PATENT DOCUMENTS 2,985,483  5/1961  Bishop et al. .
3,174,742  3/1965  Stelzer .
3,190,140  6/1965  Werner .
3,266,328  8/1966  Rott .
3,444,701  5/1969  Randolph .
4,081,926  4/1978  Jaroin .

FOREIGN PATENT DOCUMENTS 125915  10/1975  Japan .

Primary Examiner—Rodney M. Lindsey
Attorney, Agent, or Firm—Finnegan, Henderson, Farabow, Garrett & Dunner

[57] ABSTRACT

The sliding roof portion of a motor vehicle is connected to two shoes, each of which is made of synthetic resin and slidably fitted in a guide groove of the lateral rail of the fixed portion of the vehicle roof. Two toothed coils are provided to be driven by a driving toothed wheel interposed between each of the coils in axially opposite directions. The connection between the toothed coil and the shoe is completed simultaneously with the insert formation or molding of the shoe so that the coil may be secured to the shoe.

4 Claims, 2 Drawing Sheets

FIG. I

DRIVING CABLE CONNECTION

This is a continuation of application Ser. No. 280,368, filed July 6, 1981 which is a continuation of Ser. No. 024,977 filed Mar. 29, 1979, now abandoned.

BACKGROUND OF THE INVENTION

This invention relates to a driving cable connection and more particularly to improvements in the connection between a sliding shoe in a guiding rail and a driving cable for moving the shoe.

In the operation of sliding roofs or sliding windows of motor vehicles, the use of a shoe connected to a sliding roof or window glass and slidable in the guiding groove of a support rail, thereby moving the sliding roof or window glass between open and closed positions, and an axially movable cable connected to the shoe and having annular ribs or helical ribs at its periphery are well known. It is a usual practice to provide a driving toothed wheel between two cables, each connected to the shoe so as to drive the two cables in opposite directions in the manner of a rack and pinion drive. The driving wheel is connected to a suitable drive such as a hand crank or an electric motor.

Accurate movement of the sliding roof or window glass is ensured by a rigid connection between the shoe and the driving cable, with the diameter of the connection being limited by the outer diameter of the driving cable, because the cable has to be axially displaced in the guide groove. Therefore, it is a conventional practice to insert a free end of the helical rib or coil of the toothed cable in a hole in the lateral extension of the shoe to be fixed with each other by a suitable stopper. Such conventional connection of the cable and the shoe has the disadvantage that it is difficult to ensure sufficient rigidity of attachment due to the loose fitting of the cable core to the hole of the shoe extension, and the effort required to perform the attachment in assembling the sliding roofs or sliding windows is time-consuming.

SUMMARY OF THE INVENTION

Accordingly, it is one of the objects of this invention to provide a connection between a shoe and a driving cable which may resolve the problems of the conventional connection.

It is another object of this invention to provide a connection between a shoe and a driving cable in which the toothed cable may be securely fitted to the shoe, thereby ensuring accurate movement of the sliding roof or window glass of a motor vehicle.

It is a further object of the invention to provide a connection between a shoe and a driving cable which may be accomplished simultaneously with the formation of the shoe, thereby diminishing the attachment work required during assembly.

It is still another object of the invention to provide a connection between a shoe and a driving cable which is inexpensive in manufacture and simple in construction.

In order that the invention may be clearly understood and readily carried into effect, reference will now be made, by way of example, to the accompanying drawings.

DETAILED EXPLANATION OF THE INVENTION

Figure 1:
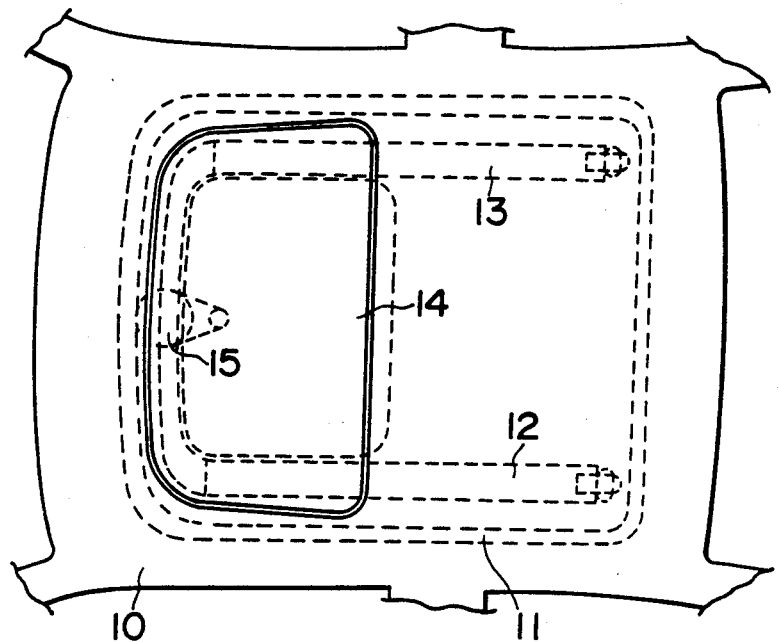
FIG. 1 is a plan view of a motor vehicle with a sliding roof in which an embodiment of this invention is adapted.
Figure 2:
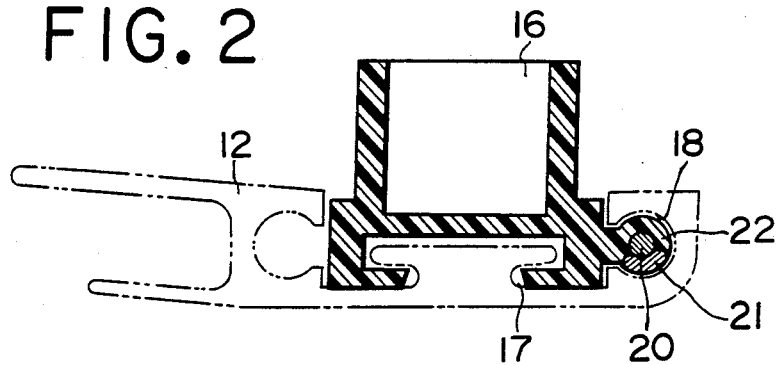
FIG. 2 is a sectional view showing a driving cable connection according to the invention.
Figure 3:
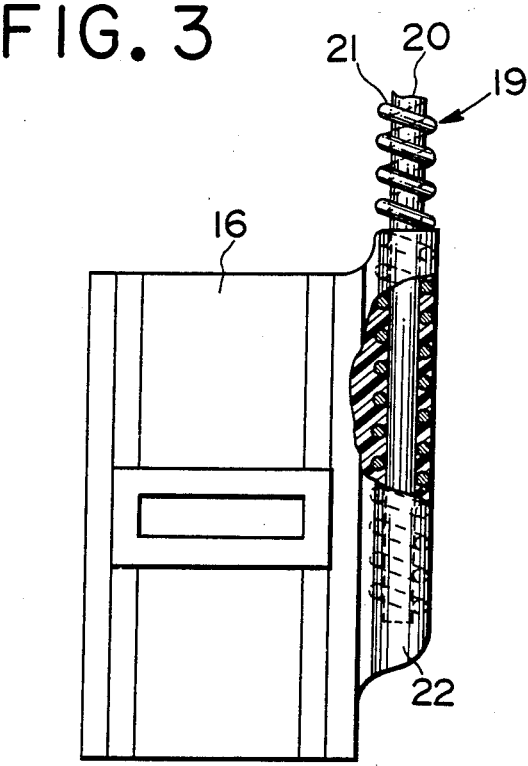
FIG. 3 is a plan view of a fragmentary section of the driving cable connection of FIG. 2.

Referring first to FIG. 1 in which a fixed vehicle roof 10 has a sliding roof frame 11 secured therein, guide rails 12 and 13 are mounted on the side parts of the frame 11 along which a sliding panel 14 will be slid upon operation of a driving member 15.

A shoe 16 made of synthetic resin and connected to the sliding panel 14 is slidably fitted in a first groove 17 provided in each of the lateral guide rails 12 and 13. Each of the rails 12 and 13 is further provided with a second groove 18 in which an axially movable drive cable 19 is so guided that it resists tensile and compressive forces in the axial direction. The driving cable 19 driven by the driving member 15 comprises a core 20 and spiral coils 21 securely wound therearound.

The shoe 16 is provided with a lateral extension 22 at its outer side to be slidably fitted within the second groove 18 of the lateral rail 12.

The end of the drive cable 19 is integrally connected to the lateral extension 22 of the shoe 16 simultaneously with the formation of the shoe 16. More specifically, the shoe 16 is made by the insert formation such as pressure or transfer formation, i.e. molding, during which the cable end is inserted in the lateral extension 22 so that the synthetic resin, in its molten state, may flow between the spiral coils 21 and on the core 20 of the cable 19. Therefore, no clearance is provided between the cable 19 and the lateral extension 22 of the shoe 16, so that they are firmly connected with each other.

When the driving member 15 is actuated by means of a hand crank or an electric motor, the two cables are axially driven in opposite directions in the manner of a rack and pinion drive. Thus, the shoe 16 rigidly connected to the toothed cable 19 will ensure reliable movement of the sliding panel 14.

It will be apparent that the present invention may be applied to another device such as the sliding windows of motor vehicles.

What is claimed is:

1. A shoe construction for slidably mounting a vehicle roof on a guide rail and for connecting the vehicle roof to a movable driving cable, comprising: a shoe member slidably fitted in a first groove in the guide rail, said member having a lateral extension slidably fitted in a second groove in the guide rail, with a portion of the extension being of circular cross section and being integrally molded about a portion of the driving cable, said portion of the driving cable being of sufficient length to rigidly connect the driving cable to the shoe member.

2. A shoe construction for slidably mounting a vehicle roof on a guide rail and for connecting the vehicle roof to an axially movable driving cable having a toothed periphery, comprising: a shoe member slidably fitted in a first groove in the guide rail, said member having a lateral extension slidably fitted in a second groove in the guide rail, with a portion of the extension being integrally molded about a portion of the driving cable, said portion of the extension having an outer diameter substantially equivalent to the widest dimension of the toothed periphery of the driving cable, and said portion of the driving cable being of sufficient length to rigidly connect the driving cable to the shoe member.

3. A shoe construction as claimed in claim 2, wherein the driving cable comprises a core member having a spiral coil fixedly wound about its periphery.

4. A shoe construction as claimed in claims 1 or 2, wherein the shoe member is formed from a synthetic resin material.

* * * * *